(12) United States Patent
Kuhlmann et al.

(10) Patent No.: US 8,202,921 B2
(45) Date of Patent: Jun. 19, 2012

(54) AQUEOUS ALKYD RESIN EMULSION FOR FIXING WATER-SOLUBLE DYES

(75) Inventors: Peter Kuhlmann, Wülfrath (DE); Reinhard Winter, Wülfrath (DE); Kurt Holzhäuser, Ecublens (CH)

(73) Assignee: Ashland_Sudchemie-Kernfest GmbH, Hilden (DE)

( * ) Notice: Subject to any disclaimer, the term of this patent is extended or adjusted under 35 U.S.C. 154(b) by 445 days.

(21) Appl. No.: 11/911,984

(22) PCT Filed: Apr. 25, 2006

(86) PCT No.: PCT/EP2006/003823
§ 371 (c)(1),
(2), (4) Date: Apr. 28, 2008

(87) PCT Pub. No.: WO2006/114281
PCT Pub. Date: Nov. 2, 2006

(65) Prior Publication Data
US 2008/0287602 A1 Nov. 20, 2008

(30) Foreign Application Priority Data
Apr. 25, 2005 (DE) .......... 10 2005 019 087

(51) Int. Cl.
*C08L 67/00* (2006.01)
*C08L 75/00* (2006.01)
*C08G 69/00* (2006.01)

(52) U.S. Cl. ........ 523/501; 523/503; 524/590; 524/591; 528/288; 528/302

(58) Field of Classification Search .................. 524/590, 524/591; 528/288, 302; 523/501
See application file for complete search history.

(56) References Cited

U.S. PATENT DOCUMENTS

| | | | |
|---|---|---|---|
| 3,442,835 A | 5/1969 | Curtice | |
| 3,639,315 A | 2/1972 | Rodriguez | |
| 4,555,564 A | 11/1985 | Fischer | |
| 4,976,785 A * | 12/1990 | Nakano et al. | 106/287.17 |
| 6,787,599 B1 | 9/2004 | Kuhlmann | |
| 7,262,255 B2 | 8/2007 | Winter | |
| 2010/0196687 A1 * | 8/2010 | Isono et al. | 428/220 |

FOREIGN PATENT DOCUMENTS

| | | |
|---|---|---|
| FR | 2552769 | 4/1985 |
| GB | 1038696 | 8/1966 |
| JP | 61053337 | 3/1986 |
| JP | 63132975 | 6/1988 |

OTHER PUBLICATIONS

English translation of International Preliminary Report on Patentability pertaining to international application No. PCT/EP2006/003823, filed in the U.S. under U.S. Appl. No. 11/911,984. This application may contain information material to the patentability of the current application, 2007.

* cited by examiner

*Primary Examiner* — Tae H Yoon
(74) *Attorney, Agent, or Firm* — Kagan Binder, PLLC

(57) ABSTRACT

The invention provides aqueous resin emulsion containing a resin obtained by reaction of a composition containing at least:
- at least one polyhydric alcohol having at least two hydroxyl groups,
- at least one polyetherpolyol having a molecular weight of 400 to 8000 g/mol,
- at least one monobasic carboxylic acid, and
- at least one polybasic carboxylic acid having at least two carboxyl groups or its anhydride, to form a resin and the resin emulsion is modified by providing basic groups. The invention further relates to a process for preparing a resin, to a resin as obtained by the process and to a coating film obtained from the resin emulsion.

23 Claims, No Drawings

AQUEOUS ALKYD RESIN EMULSION FOR FIXING WATER-SOLUBLE DYES

This invention concerns an aqueous resin emulsion, in particular alkyd resin emulsion, a process for preparing a resin as may be included in the resin emulsion, a resin as obtainable using the process, and also a coating film obtainable from the resin emulsion.

Coating and paint systems based on water as solvent are ecologically desirable in that, for example, emissions of organic solvents are avoided when the paint or coating dries. There are many sectors, including for example the sector of wall paints and decorative paints, where the switch to waterborne systems from systems based on organic solvents is already almost complete.

U.S. Pat. No. 1,038,696 describes a process for producing a water-soluble alkyd resin comprising, in a first step, producing a mixture from a polyethylene glycol or a polypropylene glycol, which each have a molecular weight between 600 and 6000, and a non-oxidizing monobasic fatty acid having 6 to 18 carbon atoms or an aromatic or saturated aliphatic acid containing 7 to 14 carbon atoms and not being a fatty acid. This mixture has further added to it an aromatic or a saturated aliphatic dicarboxylic acid or anhydride, comprising 4 to 10 carbon atoms. This mixture is reacted with temperatures of 210 to 290° C. (410 to 550° F.). The reaction product obtained in the process has added to it a polyhydric alcohol of 2 to 8 carbon atoms other than polyethylene glycol or polypropylene glycol. The mixture is reacted at 210 to 290° C. (410 to 550° F.) until a product having an acid number of less than 10 is obtained. The free acid groups still present in the reaction product are neutralized with a base which is volatile at temperatures of less than 190° C. (375° F.).

U.S. Pat. No. 3,442,835 describes a process for preparing alkyd resins modified with polyethylene glycol chains. These resins are dispersible in water. They contain as constituents 20 to 45% of a drying oil, 15 to 40% of a polyhydric alcohol having 2 to 6 hydroxyl groups per molecule, 5 to 15% of polyethylene glycol having a molecular weight of 600 to 6000, 10 to 25% of a non-oxidizing monobasic carboxylic acid having 6 to 18 carbon atoms and also 20 to 35% of a dicarboxylic acid or anhydride having 4 to 10 carbon atoms. The alkyd resins are obtained by heating the drying oil, the polyethylene glycol and one-third of the polyhydric alcohol in a first processing step to 180-290° C. (350 to 550° F.) until a mixture having an acid number of 0 to is obtained. The mixture is cooled down and then the remaining polyhydric alcohol and also the dicarboxylic acid or anhydride are added. In a second processing step, the mixture is heated to 180-290° C. (350 to 550° F.) until a mixture having an acid number of 5 to 25 is obtained. The material obtained is neutralized and then dispersed in an aqueous medium.

U.S. Pat. No. 3,639,315 describes a process whereby aqueous dispersions of alkyd resins or polyesters having free hydroxyl groups can be modified. To this end, the aqueous dispersion of the alkyd resin is admixed with organic isocyanates selected from the group consisting of toluene diisocyanate, phenyl isocyanate and 4,4'-methylenebis(cyclohexyl isocyanate). The reaction is carried out over a period of 5 to 180 minutes at a temperature between 20 and 95° C. (65 and 200° F.) until all of the organic isocyanate has reacted. The reaction is carried out under slightly alkaline conditions, i.e., at a pH of about 7.0 to 7.5. Under these conditions, surprisingly, the isocyanate is not decomposed by the water and instead a reaction takes place between the free hydroxyl groups of the alkyd resin and the isocyanate groups. Thus, crosslinking of the alkyd resin polymers occurs in the course of the reaction, raising the molecular weight of the synthesized resin compared with the starting material.

DE 198 22 468 A1 describes two-component waterborne coating systems comprising an isocyanate component and an aqueous emulsion of a hydroxyl-functional alkyd resin. The alkyd resin is obtained from an oil or fatty acid component, a polyhydric alcohol, a polyetherpolyol having a molecular weight of 400 to 8000, a monobasic carboxylic acid and also a dicarboxylic acid or anhydride. To raise the starting molecular weight and to improve the physical drying performance to ensure more rapid drying, the alkyd resin can be pre-crosslinked with isocyanates. However, not more than 30% of the available hydroxyl groups should be reacted when the hydroxyl-functional alkyd resin is modified with isocyanate. The temperature range in which the reaction with isocyanate is carried out is typically from 100 to 70° C. and preferably from 200 to 50° C. After neutralization with ammonia or amines, the alkyd resins are emulsifiable in water without addition of solvents. The resulting emulsions typically have a solids content of 20 to 70% and a pH of 6 to 9. They are preferably neutralized with lower alkylamines, such as ethylamine, diethylamine or triethylamine, which are volatile at temperatures below 180° C., preferably 120° C. To produce a stock coating, the alkyd resin is diluted with water to the desired viscosity and, if appropriate, admixed with further customary adjuvants. The hardener, i.e., the isocyanate, is added to the stock coating shortly before processing. The mixing ratio between stock coating and isocyanate hardener depends on the proportion of hydroxyl groups in the polyol component and on the NCO content in the isocyanate component. Waterborne coatings typically utilize distinctly higher isocyanate quantities, since, for example, isocyanate reacts with water to form polyureas and is then no longer available for crosslinking with the polyol component. The polyol component of these coatings comprises no basic groups.

DE 101 15 933 A1 describes a polyester resin emulsion and a two-component waterborne coating. The hydroxyl-functional polyester resin present in the emulsion is obtained by reacting a composition containing
(i) at least one low molecular weight polyhydric alcohol having at least two hydroxyl groups per molecule,
(ii) at least one polyetherpolyol,
(iii) at least one monofunctional saturated aliphatic, cycloaliphatic or aromatic carboxylic acid, and
(iv) at least one polycarboxylic acid having at least two carboxyl groups,
the composition being free of ethylenically unsaturated monocarboxylic acids.

On some substrates, such as wood, chipboard or walls badly contaminated with tobacco smoke, however, aqueous coatings tend to dissolve water-soluble colored substances out of the substrate. This leads to a discoloration of the coating film. These discolorations prove impossible to remove in practice, even by repeated overpainting. This phenomenon is often also referred to as "bleed-through".

Examples of dyes which, in aqueous systems, lead to discolorations of the coating layer are wood ingredients, such as tannins, phenols and abietic acid, or substances present in tobacco smoke, such as nicotine or various phenolic compounds. These compounds contain ionic groups which cause these dyes to be water-soluble. The predominant number of the dyes has an anionic (acidic) character. As well as these anionic dyes, there are also a number of cationic (basic) dyes which cause discolorations of coating layers. Their proportion, however, is distinctly smaller as compared with the anionic dyes.

Dyes having ionic groups are fixable with coating binders which likewise contain ionic groups, these groups having an opposite charge to the charged groups of the dye. A kind of ionic bond then forms between the dyes and the ionic groups of the coating binder. The components of the coating which provide ionic groups, however, have to have a sufficiently high molecular weight, since otherwise no fixing of the dyes in the coating film is possible. The ammonium salts of anionic dyes are generally more soluble in water than the pure dye. Converting the troublesome dyes into their ammonium salts would accordingly only enhance their bleed-through tendency.

The acrylate dispersions often used as wall paint or wood coating typically contain no ionic groups. This is why troublesome dyes cannot be fixed in the coating layer using such systems. Acrylate dispersions further contain emulsifiers which enhance the bleed-through effect still further.

To achieve a blocking effect against anionic dyes, which are responsible for the overwhelming proportion of troublesome discolorations, cationic resin systems having basic groups are currently utilized in stain block paints. Paints based on such cationic resin systems generally exhibit a good blocking performance against the bleed-through of anionic dyes. However, cationic dyes are not fixed by such resin systems and continue to bleed through.

However, the commonly used cationic resin systems have various disadvantages in use. To be able to bind anionically charged dyes, the cationic resins have to be present in protonated form, i.e., the emulsion of the cationic resin has an at least slightly acidic pH. When coating systems containing polyacrylates or alkyd resin systems are used, however, it is typically necessary to set a slightly alkaline pH in order to deprotonate the carboxyl groups in the resin and so obtain stable emulsions in water. Problems can accordingly arise with the compatibility of the cationic resin systems with components of commonly used coating systems, which can lead to restrictions in the stability of the coating emulsions. When cationic resins are added to an emulsion of an alkyd resin or of a polyacrylate, the cationic groups are deprotonated and the emulsion coagulates. In addition, the wetting properties of such cationic resins or systems are typically worse than in the case of anionic or nonionic systems.

With problem cases, therefore, systems based on organic solvents are currently still being used in order that bleed-through may be reliably prevented and an unstained surface may be obtained. However, the use of such systems will no longer be possible in the foreseeable future because of statutory regulations.

It is an object of the present invention to provide a water-borne resin system whence layers can be produced which exhibit a blocking action against the bleed-through of troublesome water-soluble dye systems.

This object is achieved by a resin emulsion having the features of claim 1. Advantageous developments of the resin emulsion are subject matter of dependent claims.

The aqueous resin emulsion of the present invention contains a resin obtained by reaction of a composition containing at least:
- at least one low molecular weight polyhydric alcohol having at least two hydroxyl groups,
- at least one polyetherpolyol having a molecular weight of 400 to 8000 g/mol,
- at least one monobasic carboxylic acid, and
- at least one polybasic carboxylic acid having at least two carboxyl groups or its anhydride, the resin emulsion being modified by providing basic groups which are present in a molecule which has at least two basic groups and which has a molecular weight of at least 100 g/mol.

The resin in the resin emulsion of the present invention contains moieties derived from polyetherpolyols. As a result, the resin acquires very good solubility or dispersibility in water. In addition, the resin contains carboxylic acid groups introduced into the polymer via incompletely reacted dicarboxylic acids. These carboxylic acid groups are normally neutralized, for example through the addition of low molecular weight amines, such as triethylamine. A stable emulsion of such a resin therefore normally has a slightly alkaline pH, for example in the range from 7.0 to 7.5, so that the carboxylic acid groups are converted into negatively charged carboxyl groups which are present as, for example, ammonium salts, such as triethylammonium salts.

It has now emerged that, surprisingly, emulsions of the above-described resins are relatively insensitive to pH changes and that, for example, such an emulsion remains stable even at acidic pH values at which amino groups can be protonated for example. An emulsion which is stable for a prolonged period, for example several hours, is even obtained at a pH of less than 3. pH values in the range of 5.5 to 6.5 give emulsions which can remain stable for several weeks. Surprisingly, it is therefore possible to prepare stable emulsions which on the one hand contain the above-described resin comprising carboxylic acid groups and hence anionic groups, while the system on the other hand also comprises basic, i.e., cationic, groups.

Conditions which have to be observed for stable emulsions of cationic resins are in principle incompatible with the conditions for stable emulsions of anionic resins, and vice versa. To obtain a stable emulsion, charged ionic groups have to be present in the polymer. Under conditions where cationic resins exist in protonated form, the negatively charged groups of anionic resins, for example carboxyl groups, are usually likewise protonated, so that they are present in neutral form. Combining an emulsion of a cationic resin with an emulsion of an anionic resin therefore normally does not give a stable emulsion of the two resins, but the emulsion coagulates as the emulsions are combined.

The aqueous resin emulsion of the present invention provides not only anionic but also cationic groups for binding ionic dyes. The aqueous resin emulsion of the present invention can therefore be used to produce coating layers containing not only cationic but anionic groups. These layers exhibit a surprisingly high blocking action against both anionic dyes and cationic dyes. Without wishing to be theoretically bound, the inventors believe that both the anionic dyes and the cationic dyes are fixed in the resin or in the coating layer in a kind of ionic bond. The anionic carboxyl groups are covalently bound to the resin, so that migration of cationic dyes into the coating layer is substantially prevented.

To be able to reliably fix the anionic dyes in the coating layer also, the ion complex of dye and cationic group has to have a sufficiently low solubility in water. This can be achieved when the molecule which provides the basic groups in the emulsion provides a plurality of basic groups, i.e., at least two, preferably more than three and in particular more than 4, basic groups and has a sufficiently high molecular weight. The water-soluble dye and the basic groups form an ion complex which becomes fixed in the matrix of the dried coating layer. The degree of fixing of the dye in the coating layer increases with the molecular weight of the compound through which the basic groups are provided. Preference is therefore given to adding molecules which have a polymeric character, i.e., a comparatively high number of basic groups and also a high molecular weight. This can be achieved in accordance with the present invention when, for example, the basic or cationic groups are provided by the alkyd resin. To this end, compounds comprising basic groups in free or protected form can be added in the course of the preparation of the alkyd resin, so that the basic groups are introduced into the molecular scaffold in the course of the synthesis of the alkyd resin alongside the acidic anionic groups. In an alternative embodiment, the alkyd resin can also be modified after its preparation by introducing basic groups into the polymer scaffold. To this end, the alkyd resin may, after its synthesis, with a suitable compound comprising a reactive group for the reaction with the alkyd resin and also at least one basic group, if appropriate in protected form.

To be able to form a water-insoluble complex with the dye, it is alternatively also possible to produce from the dye and the molecule which provides the basic groups a complex whose molecular weight is sufficiently high and whose solubility in water, or its mobility within the resin, is therefore sufficiently reduced. The moiety on which the basic groups are provided should therefore be chosen such that it provides a sufficiently high molecular weight. The molecular weight of the molecule through which the basic groups are provided is preferably made as high as possible. The molecule through which the basic group or groups are provided therefore has a molecular weight of at least 100 g/mol, preferably at least 200 g/mol, more preferably at least 300 g/mol and even more preferably at least 500 g/mol. The upper limit for the molecular weight of the molecule through which the basic groups are provided is determined by the requirement of providing a stable emulsion which has good processing properties. The basic groups can be attached for example to a polymer which has a sufficiently high molecular weight. Owing to the relatively high molecular weight of the molecule which comprises the basic group, the ionic complex with the dye to be fixed has a comparatively low solubility in water, so that a reliable fixing of the dye in the coating layer is effected. This reliably prevents the bleed-through of, for example, dyes from tobacco smoke which comprise not only anionic but also cationic dyes.

The solvent in the resin emulsion of the present invention is essentially water. Only in exceptional cases may it be necessary to add small amounts of organic solvents in order that the properties of the coating, for example flow, wetting or its film properties, may be adjusted to a desired value. Suitable organic solvents are for example alcohols, such as ethanol or propanol, butylglycol or butyldiglycol, ketones, such as acetone or ethyl methyl ketone, or ethers, such as tetrahydrofuran. The proportion of the emulsion which is attributable to the organic solvent is preferably as low as possible. The proportion is preferably less than 10% by weight and more preferably less than 5% by weight, based on the weight of the resin emulsion. Preferably, the resin emulsion is free of organic solvents. When the resin emulsion or a paint produced therefrom is applied, therefore, no or at least very low emissions of organic solvents have to be tolerated.

The resin is prepared using in principle the constituents customary in the preparation of polyesters or alkyd resins.

Suitable low molecular weight polyhydric alcohols having at least two hydroxyl groups are for example saturated aliphatic alcohols having at least two and preferably more than two hydroxyl groups per molecule. Not only monomolecular compounds of the polyhydric alcohols can be used but also those which have a very low degree of oligomerization of preferably up to 6, for example di-, tri- or tetramolecular compounds. Examples of such low molecular weight oligomers are diethylene glycol or triethylene glycol. The molecular weight of such low molecular weight compounds is typically less than 400 and preferably less than 200 g/mol. The low molecular weight alcohols preferably have a molecular weight of at least 60 g/mol.

Particular preference is given to using polyhydric alcohols having at least two, in particular more than two but not more than six hydroxyl groups per molecule. Suitable low molecular weight polyhydric alcohols have preferably 2 to 20 and more preferably 2 to 8 carbon atoms.

Examples of suitable polyhydric alcohols are:
dihydric alcohols of the general formula

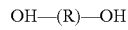

where R is a divalent saturated or unsaturated aliphatic or cycloaliphatic hydrocarbyl radical which may contain one or more (preferably not more than 4) non-peroxidic oxygen atoms and has preferably 2 to 20 and more preferably 2 to 8 carbon atoms, such as ethylene glycol, diethylene glycol, propylene glycol, dipropylene glycol, butylene glycol, dibutylene glycol or neopentylglycol;
higher alcohols of the general formula

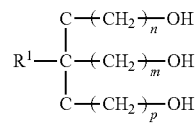

where n, m and p are independently 0, 1, 2 or 3 and $R^1$ is hydrogen, a saturated aliphatic or cycloaliphatic $C_1$-$C_6$ hydrocarbyl radical or a radical $OH—(CH_2)_q$, where q is 0, 1, 2 or 3 (with the proviso that q and m are not both 0), such as glycerol, trimethylolethane, trimethylolpropane or pentaerythritol;
other higher alcohols, such as cyclohexanediol, threitol, erythritol, arabitol, adonitol, xylitol, dipentaerythritol, sorbitol, mannitol and dulcitol.

It will be appreciated that mixtures of these alcohols can also be used.

One embodiment of the present invention utilizes mixtures of at least two different polyhydric alcohols for preparing the resin. The mixture is preferably selected such that the average functionality is at least 2.0, preferably more than 2.0 and especially in the range from 2.1 to 4.5. Average functionality refers to the average number of hydroxyl groups per molecule, averaged over all polyhydric alcohols present in the mixture.

The proportion in which the polyhydric alcohols are used for preparing the resin is preferably in the range from 10% to 35% by weight and especially in the range from 10% to 30% by weight, based on the weight of the resin.

Suitable polyetherpolyols are comparatively high molecular weight polyetherpolyols, such as polyethylene glycol, polypropylene glycol or polytetrahydrofuran. Unlike the polyhydric alcohols, the polyetherpolyols are polymeric substances having a degree of polymerization of typically more than 8 and preferably in the range from 50 to 200. The preferred molecular weight for the polyetherpolyols used is in the range from 400 to 8000 and especially in the range from 1000 to 6000. Mixtures of polyetherpolyols are comprehended as well in the present invention. Unlike the above-mentioned oligomeric polyhydric alcohols, such as diethylene glycol or triethylene glycol, the polyether glycols perform in particular the task of facilitating good dispersibility of the resin in water. The polyether chains, in particular the polyethylene glycol chains, enhance the water-solubility of the resin or, in other words, enhance its compatibility with water. The inventors believe that the incorporation of these polyetherpolyols also renders the emulsion tolerant to pH values in the acidic range.

The proportion of polyetherpolyols is preferably in the range from 3% to 15% by weight and more preferably in the range from 3% to 8% by weight, based on the weight of the resin.

Useful monocarboxylic acids include saturated or unsaturated aliphatic, cycloaliphatic or aromatic compounds. In principle, any carboxylic acid customarily used for preparing alkyd resins can thus be used for preparing the resin. Preferably, the monocarboxylic acids contain ethylenically unsaturated units. The monocarboxylic acids can be used singly or as a mixture.

Suitable monocarboxylic acids are for example those of the general formula $$R^2\text{—COOR'}$$

where $R^2$ is an aromatic or straight-chain or branched saturated or unsaturated aliphatic or cycloaliphatic hydrocarbyl radical having preferably 6 to 30 carbon atoms, more preferably 8 to 24 carbon atoms and even more preferably 10 to 18 carbon atoms which is optionally substituted by straight-chain or branched alkyl groups having preferably 1 to 4 carbon atoms, and R' can be a hydrogen atom (free acid), a straight-chain or branched $C_1$-$C_4$ alkyl radical (ester) or —(CO)$R^2$ (anhydride).

It is preferable to incorporate in the resin unsaturated monocarboxylic acids having at least one, preferably at least two and more preferably one to three carbon-carbon double bonds. The introduction of unsaturated fatty acids permits subsequent crosslinking of the resin through reaction with oxygen, for example from the air. After application of the emulsion to a substrate, for example as constituent of a paint or in pure form as undercoat, the layer produced initially dries rapidly and hardens/cures through a subsequent crosslinking reaction in the course of several days to weeks. This enhances the hardness or scuff resistance of the applied paint and also its resistance to moisture.

Typical examples of suitable monocarboxylic acids are isodecanoic acid, isooctanoic acid, cyclohexanoic acid, benzoic acid, p-tert-butylbenzoic acid and long-chain carboxylic acids, including naturally occurring saturated and unsaturated fatty acids.

Examples of naturally occurring saturated carboxylic or fatty acids are lauric acid, palmitic acid and stearic acid. But technically fully hydrogenated modifications of natural, unsaturated fatty or oily acids are also very suitable.

Examples of naturally occurring unsaturated carboxylic acids are oleic acid, linoleic acid, linolenic acid, ricinenic acid, ricinoleic acid and also elaostearic acid. It is also possible to use mixtures of various fatty acids. One example of a natural mixture of fatty acids is tall oil fatty acid, which is generated as a waste product in papermaking and consists mainly of oleic acid and linoleic acid.

Mixtures of various carboxylic acids can also be used, in which case it is preferable to use mixtures of fatty acids and shorter-chain or aromatic carboxylic acids. The additional introduction of carboxylic acids which, compared with fatty acids, have sterically less bulky radicals, can be used to adjust the properties of the resin, such as its swellability, and hence influence the properties of the emulsion, for example its viscosity or flowability.

The amount of monocarboxylic acids is preferably in the range from 10% to 60% by weight and especially in the range from 15% to 40% by weight, based on the resin.

The monocarboxylic acids and the polyhydric alcohols can also be introduced into the resin via natural oils, preferably drying oils, by a transesterification reaction. In the formula $R^2$—COOR' shown above, R' is in this case a glyceride radical, i.e., a glycerol esterified with two further fatty acids.

As already elucidated above in connection with the unsaturated fatty acids, the use of drying oils permits subsequent curing/hardening of the resin through a cross-linking reaction involving oxygen. The use of drying oils is therefore particularly preferred when the resin emulsion of the present invention is further processed into a wall paint, particularly for interiors. Drying oil therefore refers to a triglyceride of fatty acids which typically comprise 10 to 24 carbon atoms, where at least a portion of the fatty acids has at least one, preferably at least two and more preferably one to three carbon-carbon double bonds. Drying oils typically have an iodine number of >150 (ASTM D-1059/85). Examples of drying oils are linseed oil, tung oil, ricinenic oil and fish oils. It is also possible to use semidrying oils which have an iodine number in the range from 100 to 150. Examples of semidrying oils are soy oil, safflower oil and sunflower oil.

Non-drying oils are notable for good weathering resistance and low tendency to yellow. The non-drying oils used according to the present invention comprise any naturally occurring oils normally employed in the manufacture of alkyd resins. The term "non-drying oil" is used herein as meaning a triglyceride of fatty acids generally having 10 to 24 carbon atoms per molecule and an iodine number of <110. Mixtures are cocomprehended by the invention.

Suitable non-drying oils include vegetable oils such as apricot kernel oil, peanut oil, kapok oil, coconut oil, almond oil, olive oil, palm oil, castor oil. Preference is given to peanut oil, coconut oil, castor oil.

The term "oils" also includes esters of fatty acids having 10 to 24 carbon atoms with triols such as trimethylolethane, trimethylolpropane, where the mole ratio of fatty acid to triol is 3:1. It should be understood that it is within the scope of this invention to use the oils as such or as ester-forming precursors, for example as a mixture of fatty acids and triols, and form the ester in situ from the precursors. Also, the oil or fatty acid component may comprise mixtures of various oils.

When oils are used, the reaction mixture is preferably additionally admixed with a preferably polyfunctional, short-chain alcohol, which preferably comprises 1 to 6 carbon atoms and 1 to 5 hydroxyl groups, more preferably 2 to 4 carbon atoms and 2 to 4 hydroxyl groups, such as glycerol or pentaerythritol, in order that the glycerides may be partially split in a transesterification reaction with the short-chain alcohol in order thereby to augment the polymerization of the resin.

It is also possible to use carboxylic acids which as well as the carboxyl group additionally contain a hydroxyl group, as is the case for example with castor oil fatty acid, dimethylolpropionic acid or hydrolyzed, epoxidized fatty acids.

The resin may be prepared using the monocarboxylic acids for example in the form of the free acid, its anhydrides or in the form of esters of simple alcohols (for example $C_1$-$C_4$ monoalcohols) or else, as explained above, in the form of a triglyceride.

The present invention preferably utilizes unsaturated aliphatic or cycloaliphatic monocarboxylic acids.

One embodiment of the present invention utilizes mixtures of at least two different monocarboxylic acids for preparing the resin.

Suitable polybasic carboxylic acids having at least two carboxyl groups preferably have 4 to 15 and more preferably 4 to 10 carbon atoms per molecule and include aliphatic, cycloaliphatic and aromatic carboxylic acids.

Suitable polybasic carboxylic acids are for example dicarboxylic acids of the general formula

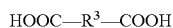
HOOC—R³—COOH where $R^3$ is a divalent radical selected from a saturated, branched or unbranched, aliphatic or cycloaliphatic radical having 2 to 13 carbon atoms (preferably having 2 to 6 carbon atoms), an aromatic hydrocarbyl radical having altogether 6 to 13 carbon atoms (preferably having 6 to 10 carbon atoms) optionally substituted by alkyl groups having preferably 1 to 4 carbon atoms, or an unsaturated, straight-chain or branched, aliphatic radical having 2 to 13 carbon atoms (preferably having 2 to 6 carbon atoms).

Examples thereof are maleic acid, fumaric acid, succinic acid, terephthalic acid, isophthalic acid, adipic acid, glutaric acid, azelaic acid and o-phthalic acid.

However, higher-functional carboxylic acids, i.e., polycarboxylic acids having more than two (but preferably not more than six) carboxyl groups per molecule, can also be used.

Examples of higher-functional carboxylic acids are tricarboxylic acids, such as trimellitic acid, tricarballylic acid, trimesinic acid or hemimellitic acid, tetracarboxylic acids, such as pyromellitic acid, or polycarboxylic acids having more than three carboxyl groups, such as mellitic acid.

Useful polybasic carboxylic acids also include polycarboxylic acids having at least two carboxyl groups and additionally one or more OH groups, such as maleic acid, tartaric acid, mesotartaric acid, pyruvic acid or citric acid.

The resin can be prepared using the polybasic carboxylic acids either in the form of the free acid or as anhydride or esters of simple $C_1$-$C_4$-alcohols.

A preferred embodiment utilizes mixtures of at least two different polybasic carboxylic acids (preferably dicarboxylic acids). The average functionality is preferably at least 2.0 and more preferably in the range from 2.0 to 3.0.

The proportion of the resin which is attributable to the polybasic carboxylic acids is preferably in the range from 10% to 40% by weight and more preferably in the range from 15% to 35% by weight.

The alcohol and acid components are generally esterified in the temperature range of 180-260° C. by elimination of water which is removed from the reaction mixture by distillation. As customary in resin chemistry, this water can also be removed by azeotropic distillation or assisted by reduced pressure.

The stoichiometric ratios are adjusted in a conventional manner so as to obtain polyester resins having acid numbers of 5-20 and hydroxyl contents of 1-8% by weight.

The hydroxyl content is determined, as usual in this field, using acetic anhydride. Acid number is determined in accordance with German standard specification DIN 53402.

As customary in alkyd resin chemistry, the resin can be prepared by the one-stage process or by the two-stage process.

In the one-stage process, oil or fatty acid component, monocarboxylic acid, polybasic carboxylic acid or anhydride are esterified with the polyalcohols and the polyether alcohol at temperatures of 180 to 260° C. until an acid number of 3 to 80 mg KOH/g and preferably of 8 to 20 mg KOH/g is reached.

The two-stage process typically proceeds from naturally occurring oil and reacts it at temperatures of 180 to 260° C. with polyhydric alcohols until the desired degree of transesterification is reached. In the second stage, this reaction product is esterified with the mono- and polycarboxylic acids and also the polyether alcohol at 200° C. to 260° C. by elimination of water until an acid number of 3 to 80 mg KOH/g and preferably of 8 to 20 mg KOH/g is reached.

When the oil or fatty acid component is formed in situ from precursors, for example from a mixture of fatty acid and triol, a one-stage process is preferred.

The hydroxyl content of the alkyd resin in the emulsion of the present invention is preferably in the range from 1% to 8% by weight based on the alkyd resin.

To increase the molecular weight of the resin in the emulsion and to improve the physical drying performance to ensure faster drying, the resin can be precrosslinked with isocyanates. The temperature at which the reaction with isocyanate takes place typically ranges from 10 to 70° C. and preferably ranges from 20 to 50° C. Modification may be effected using for example saturated aliphatic, cycloaliphatic or aromatic polyisocyanates which preferably have an average functionality of at least two and especially of 2.0 to 4.5. This reaction is carried out at neutral to weakly alkaline pH, preferably in the range from 7.0 to 7.5. The hydroxyl groups still present on the resin can then react with the isocyanate group to form a urethane. The reaction with the diisocyanate is not carried out until an emulsion of the resin in water has been prepared, i.e., after the resin is already in the form of fine droplets. The diisocyanates are substantially water-insoluble and preferentially dissolve in the resin droplets of the emulsion. The reaction of the isocyanate with the resin therefore takes place within the fine droplets, while the secondary reaction of the isocyanate with water is almost completely suppressed. Crosslinking the alkyd resin does not involve basic groups being introduced into the resin polymer, so that a blocking action against anionic as well as cationic dyes cannot be achieved by crosslinking the resin. This can be demonstrated by means of IR spectroscopy for example. The IR spectrum features vibrations for NH groups at 3500-3100, 1650-1510 and 850-700 $cm^{-1}$. Vibrations in these regions, in particular at about 1640 $cm^{-1}$, cannot be detected in the case of a diisocyanate-crosslinked alkyd resin in which no additional basic groups have been introduced.

Suitable isocyanates comprise the diisocyanates and/or higher polyisocyanates customary in this field. These can be used singly or in a mixture.

Examples of suitable isocyanates are:
toluene 2,4-diisocyanate, toluene 2,6-diisocyanate, 3-phenyl-2-ethylene diisocyanate, 1,5-naphthalene diisocyanate, cumene 2,4-diisocyanate, 4-methoxy-1,3-diphenyl diisocyanate, 4-chloro-1,3-phenyl diisocyanate, diphenylmethane 4,4'-diisocyanate, diphenylmethane 2,4'-diisocyanate, diphenylmethane 2,2'-diisocyanate, 4-bromo-1,3-phenyl diisocyanate, 4-ethoxy-1,3-phenyl diisocyanate, 2,4'-diisocyanatodiphenyl ether, 5,6-dimethyl-1,3-phenyl diisocyanate, 2,4-dimethyl-1,3-phenyl diisocyanate, 4,4-diisocyanatodiphenyl ether, 4,6-dimethyl-1,3-phenyl diisocyanate, 9,10-anthracene diisocyanate, 2,4,6-toluene triisocyanate, 2,4,4'-triisocyanatodiphenyl ether, 1,4-tetramethylene diisocyanate, 1,6-hexamethylene diisocyanate, 1,10-decamethylene diisocyanate, 1,3-cyclohexylene diisocyanate, 4,4'-methylene-bis(cyclohexyl isocyanate), xylene diisocyanate, 1-isocyanato-3-methylisocyanato-3,5,5-trimethylcyclohexane (isophorone diisocyanate), 1,3-bis(isocyanato-1-methylethyl)benzene (m-TMXDI), 1,4-bis(isocyanato-1-methylethyl)benzene (p-TMXDI) or trimethylhexamethylene diisocyanate.

To produce the emulsion, the resin can be neutralized if appropriate. The neutralization can be accomplished by adding a small amount of a neutralizing agent to neutralize a portion or all of the acid groups in the resin. Useful neutralizing agents which can be used according to the present invention include ammonia, ammonium hydroxide and primary, secondary and tertiary mono- or polyamines, including hydroxylamines, and especially lower alkylamines, such as ethylamine, butylamine, dimethylamine, diethylamine, dimethylethylamine, dimethylisopropylamine, diethanolamine, triethanolamine or butanolamine. Amines which are volatile at temperatures below 180° C., preferably below 120° C., are preferred. Particularly preferred amines are ammonia, triethylamine, dimethylamine, dimethylisopropylamine, dimethylethanolamine, ethanolamine, diethanolamine, triethanolamine, aminopropanol or dimethylaminopropanol. The amines can be added in undiluted form to give essentially anhydrous, neutralized resins capable of practically unlimited dilution or dispersion in water.

Alternatively, the resins can be neutralized by adding an aqueous solution or emulsion of amines. Inorganic neutralizing agents, such as potassium hydroxide or sodium hydroxide or carbonates can also be used.

The resin is then adjusted to a desired viscosity in water to obtain an aqueous emulsion having 5% to 70% by weight and preferably 25% to 55% by weight of resin solids (not volatile).

The resin emulsion of the present invention contains basic groups with which the resin emulsion is modified. The modification can be carried out by the basic groups being attached to the resin polymer or to a compound separate from the resin polymer. The compound which provides the basic groups has to have a molecular weight sufficient to ensure, after the formation of a complex with a dye, that the complex does not diffuse in the resin or coating layer and hence can migrate to the surface of the coating layer. A first embodiment of the present invention therefore provides the basic or cationic groups on the resin polymer. Since the alkyd resin has a high molecular weight, the anionic and cationic dyes bound in the form of an ionic complex remain securely fixed in the coating layer. A second embodiment provides the basic or cationic groups in a compound which is present alongside the alkyd resin. In this case, the molecular weight of this basic compound is ideally chosen to be high. It is preferable to choose a polymeric compound to provide the basic compounds.

To be able to provide not only cationic groups but also anionic groups for the binding of dyes, the pH of the emulsion is preferably set in a range of 5.0 to 7.0 and preferably 5.5 to 6.5. A stable emulsion is obtained in the process.

As previously explained, the modification of the resin with basic groups can be effected by adding to the emulsion of the alkyd resin a further compound comprising basic groups. This further compound shall combine with the cationic (acidic) dye to form a water-insoluble complex which can be fixed in the coating or paint layer. Compounds can be added for this purpose which comprise a plurality of basic groups in the molecule. These compounds therefore comprise at least two basic groups, preferably at least three and more preferably at least four basic groups. To minimize the water-solubility of the complex of basic compound and dye, the molecular weight of the basic compound is made as high as possible. The molecular weight of the basic compound is therefore more than 100 g/mol, preferably more than 250 g/mol and more preferably more than 500 g/mol. Preferably, the molecular weight of these compounds is less than 4000 g/mol. This upper limit applies with preference to the embodiment of the invention wherein the basic or cationic groups are provided not in the alkyd resin itself but in a compound separate from the alkyd resin. The upper limit for the molecular weight of the polymer containing basic groups is determined by the condition that the polymer has to be emulsifiable in the solvent, essentially water. When basic groups are provided in the alkyd resin, the molecular weight of the compound which provides the basic groups ultimately corresponds to the molecular weight of the alkyd resin.

It is preferable for the basic groups chosen to be amino groups, in which case not only primary but also secondary or tertiary amino groups can be chosen. Primary and secondary amino groups are preferred. The basic groups preferably have a base strength such that they are predominantly in protonated form at a pH in the range from 6.5 to 5.5. Protonation can be detected for example by NMR spectroscopy through replacement with deuterium. The basic amino groups can be detected by IR spectroscopy for example. The basic groups exhibit an absorption in the IR spectrum in the region of about 1640 $cm^{-1}$.

Suitable higher-functionality basic compounds are for example diamines, such as ethylenediamine, hexanediamine, phenylenediamine, melamine or oligomers or polymers of these compounds, such as diethylenetriamine, triethylenetetramine and so on. When higher-functional compounds having a low molecular weight of less than 100 g/mol and preferably less than 400 g/mol, such as ethylenediamine, hexanediamine or phenylenediamine, are used, these lower molecular weight compounds are fixed on the alkyd resin in order that the complex of dye and basic groups may be reliably fixed in the resin layer. It is accordingly not sufficient according to the present invention to add a low molecular weight amine, such as ethylenediamine, or ammonia to the alkyd resin as is done for example to neutralize the alkyd resin. In this case, the dyes form ammonium salts which are readily water-soluble and therefore can diffuse through the coating layer to then cause a discoloration of the coating layer.

Useful basic compounds capable of retaining a dye in the coating layer include for example high molecular weight polyamines, such as polyalkyleneimines, such as polyethyleneimine or polypropyleneimine, and also polyamidoamines, for example condensation products of fatty acids and polyamines, in which case a stoichiometric excess of polyamine is used, adducts of polyamines with low molecular weight epoxides, for example a reaction product of 1 mol of bisphenol A diglycidyl ether with 2 mol of ethylenediamine. Useful high molecular weight amino compounds further include for example the so-called aminoplasts, i.e., condensation products of higher-functional amino compounds and formaldehyde, examples being urea or melamine resins. These high molecular weight polyamines preferably have a molecular weight of more than 250 g/mol and more preferably of more than 500 g/mol.

Preferably, however, the basic groups are attached to the resin via a covalent bond. Figuratively speaking, the higher-functional basic compounds elucidated in the embodiment described above can thus also be incorporated in the resin directly. To this end, the resin can be prepared using appropriate monomers in addition, or the resin can be subsequently modified by introducing basic groups. As basic groups it is preferable for amino groups to be introduced into the resin. The amino groups can be not only primary but also secondary or tertiary amino groups. Primary and secondary amino groups are preferred.

To introduce basic groups, in particular amino groups, suitable monomers or oligomers, comprising for example an amino group or a protected amino group, can be incorporated in the course of the preparation of the resin. A protected amino group is an amino group which after incorporation of the corresponding monomer in the resin molecule can be released by a selective reaction. An example of such a protected amino group is an isocyanate group which can be decomposed to the amino group by hydrolysis, preferably at acidic pH, with elimination of carbon dioxide. It is further possible to use compounds which as well as the amino group or the protected amino group comprise at least one reactive group capable of reaction with a group, for example a hydroxyl group or a carboxyl group, of the resin. Suitable groups include for example the isocyanate group, the thioisocyanate group, the amino group or the hydroxyl group. Illustrative compounds which can be introduced into the alkyd resin by a suitable reaction are amino acids, such as alanine, aspartic acid, cysteine, cystine, glutamine, glutamic acid, glycine, histidine, isoleucine, leucine, lysine, proline, serine, tryptophan, tyrosine and valine, diamines such as ethylenediamine, hexanediamine or phenylenediamine, oligomers of these diamines with preferably 1 to 5 repeat units having the general formula $H_2N-(R-NH)_x-R-NH_2$, where R is an alkylene group having 2 to 4 carbon atoms, in particular ethylene and isopropylene, and x is from 1 to 5, such as diethylenetriamine, triethylenetetramine and tetraethylenepentamine, sulfonamides, sulfanilamide, higher molecular weight polyamines, such as polyamidoamines, for example condensation products of fatty acids and polyamines, having a stoichiometric amine excess, adducts of polyamines with low molecular weight epoxides, for example a reaction product of 1 mol of bisphenol A diglycidyl ether and 2 mol of ethylenediamine, and also polyalkyleneimines. Such higher molecular weight polyamines are typically used as hardeners for epoxy resins. As well as the amines mentioned, other amino compounds can be used as well, such as urea, melamine, carbamic esters, benzoguanamine, dicyandiamide, biguanidine, and also the condensation products prepared from these compounds with formaldehyde, the so-called aminoplasts, examples being urea resins and melamine resins.

A further way to modify the resin emulsions with basic groups consists in reacting these emulsions with reactive compounds having a basic group or which, after fixing of the reactive compound to the resin, can be modified such that they provide a basic group. In this version, the basic group is subsequently introduced into the resin by reacting the resin with a suitable compound having a group capable of reacting with a group on the resin, as well as a basic group or a protected basic group.

In a first embodiment, amino groups can be introduced into the alkyd resin by reacting a polyamine having at least two amino groups with the alkyd resin. To this end, the polyamine, for example melamine or a melamine-formaldehyde resin, can be added to the alkyd resin and the mixture heated. A portion of the amino groups can then react for example with carboxyl groups provided in the alkyd resin, by elimination of water, while another portion of the amino groups remains free and available for complexing with dyes.

A subsequent introduction of amino groups is possible, in a further embodiment of the present invention, by reacting the resin with isocyanates, in particular diisocyanates. In this embodiment, the amino group is introduced into the alkyd resin in protected form as an isocyanate group and is then released by hydrolysis. Unlike the abovementioned reaction for raising the molecular weight, where urethanes are formed at neutral to slightly alkaline pH, the reaction is conducted such that the free isocyanate group is hydrolyzed by water, preferably at an acidic pH, more preferably in the range of pH 1 to pH 3 and even more preferably pH 1.5 to pH 2.5, to form the amine. Thus, when diisocyanates are used, one isocyanate group can react with a hydroxyl group of the resin to form a urethane, while the free isocyanate group is hydrolyzed to the amine. Possible ways of doing this include for example increasing the amount of isocyanate used or the amount of water, shifting the pH in the course of the reaction of the alkyd resin with the isocyanate, and also the use of suitable catalysts. Similarly, the addition of amines, amino alcohols during the reaction of the alkyd resin with the isocyanate increases the yield of amino or urea groups on the resin molecule.

To introduce amino groups, the emulsion of the resin can accordingly be initially adjusted to a more acidic pH, for example to a pH of less than 4.0, in particular less than 3.0, with a suitable acid, for example phosphoric acid. If appropriate, a suitable catalyst can be added, dibutyltin dilaurate being an example. Then, a suitable isocyanate, for example a diisocyanate, is added. The reaction is carried out at temperatures in the range from 20 to 50° C., preferably at room temperature. As already explained above, isocyanates mix only insignificantly with water, if at all, and therefore dissolve preferentially in the resin droplets of the emulsion. One of the groups of the diisocyanate can then react with a hydroxyl group of the resin. Owing to the relatively acidic pH of the aqueous phase of the emulsion, then, the other isocyanate group can be hydrolyzed to the amino group in at least a proportion of the bound diisocyanates. It is believed that this hydrolysis takes place at the interface between resin droplets and water phase, so that the acidic pH of the water phase means that an appreciable proportion of amino groups can be introduced into the resin. After the reaction, a suitable base is used to neutralize to a pH of about 6 to obtain the resin emulsion of the present invention which remains stable for several weeks. Suitable bases for neutralizing include the basic compounds already mentioned above, triethylamine for example.

Generally, the basic groups are chosen in a proportion (based on the resin) which in the case of a nitrogenous basic group corresponds to a nitrogen content of preferably 0.2-15% by weight, more preferably 0.5-10% by weight and even more preferably 1.0 to 8.0, based on the solids content of the emulsion (i.e., based on the weight of the alkyd resin and of the polymeric nonvolatile amine when alkyd resin and basic polymer are present as separate components, or on the nonvolatile alkyd resin modified with basic groups when the basic groups are present on the alkyd resin). Nitrogen determination can be carried out in a conventional manner, for example by nitrogen determination in accordance with Kjeldahl, NMR spectroscopy or comparable methods.

The synthesis of the alkyd resins is typically carried out such that the alkyd resin obtained has an acid number in the range from about 8 to 20 mg KOH/g resin, preferably 10 to 15 mg KOH/g resin. For the subsequent introduction of basic amino groups, the synthesis can initially also be carried out so as to obtain an alkyd resin having a higher acid number of about 20 to 30 mg KOH/g resin. The reaction with the compound through which the basic amino group is introduced then reduces the acid number into the abovementioned range. But even at a lower acid number in the range from 8 to 20 mg KOH/g resin a sufficient amount of free hydroxyl groups is still available, so that an amount of basic groups which is required to obtain an adequate blocking action for the coating layer can be introduced into the resin.

The modified resin systems can also be precrosslinked with polyisocyanates in the above-described manner at a pH of about 7.0 to 7.5 to increase the molecular weight. This is done by initially effecting an increase in the molecular weight through a precrosslinking reaction and subsequently introducing basic groups into the resin if appropriate. For instance, the emulsion can be initially adjusted to a pH of about 7.0 to 7.5 and a precrosslinking reaction carried out by addition of diisocyanate. Subsequently, the pH is reduced to a value of less than 4.0, in particular less than 3.0, by addition of a suitable acid and again diisocyanate is added to introduce amino groups into the resin. Finally, the pH is adjusted to about 5.5 to 6.5 to obtain an emulsion which is stable for several weeks.

The resin emulsions described can subsequently be formulated with adjuvants customary in the paint industry, such as pigments, fillers and auxiliaries, to form pigmented or unpigmented stock coatings.

More particularly, the aqueous resin emulsion of the present invention is useful as an undercoat paint to shield paint layers. In this case, the resin emulsion incorporates no pigments for example. The aqueous resin emulsion of the present invention is further particularly useful as a wall paint. The wall paint will have the customary composition except that it incorporates the resin described above.

Preferably, no hardener is added to cure the paint. The paint is cured by reaction with atmospheric oxygen when the alkyd resin contains drying oils or unsaturated fatty acids. To speed curing, the emulsion may have a drier added to it, an example being a metal ion, such as cobalt. More preferably, cobalt soaps are added, such as cobalt naphthenate or cobalt octoate.

The present invention further provides a process for preparing a resin as described above, which comprises a composition containing at least the following components:
  at least one polyhydric alcohol having at least two hydroxyl groups,
  at least one polyetherpolyol having a molecular weight of 400 to 8000 g/mol,
  at least one monobasic carboxylic acid, and
  at least one polybasic carboxylic acid having at least two carboxyl groups or its anhydride,
being converted to a resin and the resin being modified by introduction of basic groups.

The components and also the details of the process were discussed above in connection with the resin emulsion of the present invention.

The modification of the resin through introduction of basic groups can be carried out either by polymerizing into the resin a monomer capable of providing basic groups, or by reacting the resin, after the polymerization, with a suitable reagent with which basic groups are introduced into the resin. Details of the process variants were discussed above.

The present invention further provides a resin obtainable via the process described above and also a coating film obtainable from the above-described resin emulsion by evaporating the aqueous solvent. The coating film exhibits a high blocking effect against bleed-through of dyes.

To produce the coating film, the resin emulsion described above is applied to a substrate, such as a wall or a wood or gypsum panel. Customary processes are used for this, such as application by brush or spraying. However, the emulsion can also be applied for example in a dipping process. In principle no restrictions apply here. Subsequently, the solvent in the resin emulsion, preferably water, is evaporated. The evaporating is typically effected at room temperature by exposing the coating or paint film to air in the manner customary in the case of wall paints for example. However, higher temperatures can also be employed to evaporate the solvent, in which case these higher temperatures must not be so high as for a reaction to take place between the basic groups, in particular amino groups, and the alkyd resin. The temperature for evaporating the solvent is preferably lower than 90° C., more preferably lower than 60° C. and even more preferably lower than 40° C. This distinguishes the use of the resin emulsion of the present invention as a paint from baking finishes, which are heated to temperatures in the range of more than 120° C., typically at 180 to 210° C., for crosslinking, so that a chemical reaction takes place between groups of the hardener, for example amino groups, and the alkyd resin, with crosslinking. The coating film formed is no longer water-compatible and usually also very resistant to organic solvents.

The resin emulsion of the present invention is used as a one-component system, i.e., it comprises no hardener. The curing/hardening of the coating or paint layer can be effected by reaction with atmospheric oxygen when the alkyd resin comprises unsaturated fatty acids. This curing/hardening of the coating or paint layer proceeds very slowly, typically over several weeks. In this way, the paint or coating layer acquires an admittedly low-level but sufficient degree of water and scuff resistance.

The invention will now be more particularly described with reference to examples.

EXAMPLE 1

Preparation of Alkyd Resin Emulsion

The alkyd resin emulsion was prepared similarly to Example 1 of U.S. Pat. No. 3,639,315. 261.1 g of safflower oil, 154.0 g of pentaerythritol, 186.1 g of p-tert-butylbenzoic acid, 88.8 g of polyethylene oxide glycol and 0.07 g of lithium hydroxide were heated under reflux and the water formed was removed via a water trap. The temperature was raised to 240° C. and the mixture was heated until the resin had an acid value of less than 5 mg KOH/g resin. The mixture was then cooled down and 205.5 g of phthalic anhydride, 73.6 g of isophthalic anhydride and a further 90.4 g of pentaerythritol were added. The mixture was then heated to 220° C. until an acid number of 14.4 mg KOH/g resin was obtained. The resin was neutralized by addition of 2.2 g of triethylamine and dispersed in water, yielding a white emulsion having a solids content of 42.5% by weight and a pH of 7.1.

EXAMPLE 2

Introduction of Basic Groups into Alkyd Resin

In this example, amino groups are introduced into the alkyd resin by reaction of the alkyd resin with higher isocyanates and subsequent hydrolysis of the free isocyanate groups.

288 g of the alkyd resin emulsion obtained in Example 1 were charged to a 1 l glass flask and adjusted to pH 2.5 with phosphoric acid. This emulsion was heated to 30° C. and then admixed with 12 g of a technical grade mixture of 2,4-tolylene diisocyanate and 2,6-tolylene diisocyanate (TDI) added over 5 minutes with stirring. The mixture was intensively stirred for 10 minutes and then admixed with 1.5 g of a mixture of 10% by weight of dibutyltin laurate (DBTL) in butyl acetate. The mixture was stirred for a further 2 hours and then left to stand at room temperature (23° C.) for 22 hours, during which a slightly brown emulsion formed. The brown coloration shows that aromatic amino groups have formed. This emulsion is adjusted to pH 6.0 with ammonium hydrate solution.

EXAMPLE 3

Introduction of Basic Groups into Alkyd Resin

In this example, amino groups are introduced into the alkyd resin as in Example 2 by reaction of the alkyd resin with higher isocyanates and subsequent hydrolysis of the free isocyanate groups.

Example 2 was repeated except that 1-isocyanato-3-methylisocyanato-3,5,5-trimethylcyclohexane (isophorone diisocyanate/IPDI) was used instead of TDI. The emulsion remained white, since an aliphatic amine formed.

COMPARATIVE EXAMPLE 1

Raising the Molecular Weight by Precrosslinking

In this comparative example, the polyfunctional isocyanate merely effects crosslinking of the alkyd resin, no amino groups being produced by hydrolysis of isocyanate groups.

288 g of the alkyd resin emulsion obtained in Example 1, which had a pH of 7.2, were charged to a 1 l glass flask and heated to 30° C. 12 g of a technical grade mixture of 2,4-tolylene diisocyanate and 2,6-tolylene diisocyanate (TDI) were added over 5 minutes with stirring. The mixture was stirred for a further 2 hours and then left to stand at room temperature (23° C.) for 22 hours. The emulsion retained its white color, since it is not an aromatic amine which forms but a urethane, which links individual resin polymers together to form a larger polymer.

COMPARATIVE EXAMPLE 2

In this comparative example, as in the case of Comparative Example 1, only crosslinking of the alkyd resin takes place, without any amino groups being introduced into the resin.

Comparative Example 1 was repeated except that 1-isocyanato-3-methylisocyanato-3,5,5-trimethylcyclohexane (isophorone diisocyanate/IPDI) was used instead of TDI. A white emulsion was obtained.

EXAMPLE 4

In this example, amino groups are introduced into the precrosslinked alkyd resin similarly to Examples 2 and 3 by reacting the precrosslinked alkyd resin obtained in Comparative Example 1 with diisocyanates at an acidic pH, so that free amino groups are introduced into the resin by hydrolysis of isocyanate groups.

The emulsion obtained in Comparative Example 1 was adjusted to pH 2.5 with phosphoric acid and subsequently heated to 30° C. Then, 6 g of a technical grade mixture of 2,4-tolylene diisocyanate and 2,6-tolylene diisocyanate (TDI) were added over 5 minutes with stirring. The mixture was intensively stirred for 10 minutes and then admixed with 1.5 g of a mixture of 10% by weight of dibutyltin laurate (DBTL) in butyl acetate. The mixture was stirred for a further 2 hours and then left to stand at room temperature (23° C.) for 22 hours, during which a slightly brown emulsion formed. The brown coloration shows that aromatic amino groups have formed. This emulsion is adjusted to pH 6.0 with ammonium hydrate solution.

EXAMPLE 5

In this example, amino groups are introduced by reacting an alkyd resin with a polymeric melamine resin. The melamine resin comprises amino groups of which a fraction can react with the alkyd resin, so that melamine resin and alkyd resin become covalently bonded to each other.

564 g of thistle oil, 166 g of pentaerythritol, 402 g of p-tert-butylbenzoic acid and 192 g of polyethylene glycol (molecular weight: 3000 to 3700) were heated to 230° C. in a flask fitted with a thermometer, a stirrer and also a water trap. The temperature of 230° C. was maintained until the resin formed had an acid value of 30 mg KOH/g resin. The mixture was cooled down to room temperature and then admixed with 585 g of phthalic anhydride and also a further 332 g of pentaerythritol. The mixture was then heated to 220° C. until the resin had an acid value of 15 mg KOH/g resin. 270 g of this resin were admixed at 180° C. with 30 g of a commercially available melamine-formaldehyde resin (Luwipal® 066, BASF AG, Ludwigshafen, Germany) over 5 minutes and the mixture was stirred at 180° C. for a further 15 minutes. The resin was emulsified in water at a pH of 7.5 and this emulsion was then adjusted with phosphoric acid to a pH of 5.8.

EXAMPLE 6

In this example, alkyd resin and melamine resin are present separately and are not attached to each other by a covalent bond.

270 g of an alkyd resin emulsion obtained in Example 1 were admixed at 25° C. with 30 g of a melamine-formaldehyde resin (Luwipal® 066, BASF AG, Ludwigshafen, Germany) and this emulsion was then adjusted with phosphoric acid to a pH of 6.0.

EXAMPLE 7

In this example, the amino groups are introduced into the alkyd resin by reacting the alkyd resin subsequently with a low molecular weight amine, specifically melamine. The melamine becomes covalently attached to the alkyd resin.

Example 5 was repeated except that 30 g of melamine were used instead of a melamine-formaldehyde resin.

EXAMPLE 8

In this example, the amino groups are subsequently introduced into the alkyd resin by attaching a low molecular weight polyfunctional amine, specifically triethylenetetramine, to the alkyd resin via a covalent bond.

Example 1 was repeated except that the mixture was only heated until an acid number of 30 mg KOH/g resin was obtained. The mixture was cooled down to 160° C. and then 270 g of this resin were admixed with 30 g of triethylenetetramine. The mixture was then heated again to 200° C. and maintained at 200° C. for a further 30 minutes, in the course of which the resin turned dark brown.

This resin was emulsified in water at a pH of 7.3 and the emulsion was subsequently adjusted with phosphoric acid to a pH of 6.1.

EXAMPLE 9

50 g of cigarette tobacco were placed in a glass vessel and 100 ml of water were poured on top. This mixture was heated in an autoclave at 120° C. for 30 minutes and then left to stand until the mixture had cooled down to ambient temperature. The cooled mixture was poured through a filter and the brown filtrate was used as test solution.

EXAMPLE 10

The emulsions obtained in Examples 2, 3 and Comparative Examples 1 and 2 were each used to prepare the following paint:

Under agitation by a dissolver, 635 g of water, 12.5 g of a defoamer (Foamex® 805, Tego Chemieservice GmbH, Essen, Germany) and 10 g of a wetting agent (Disperbyk® 191; Byk-Chemie GmbH, Wesel, Germany) and also 5 g of an organic thickener (Optigel® EXM 629, Sud-Chemie AG, Munich, Germany) were mixed until homogeneous. Then, with vigorous stirring, 550 g of titanium dioxide, 355 g of kaolin and 142 g of diatomaceous earth were added in succession and the entire mixture was dispersed for 10 minutes. Finally, 707 g of the respective alkyd resin emulsion and also 93 g of an associative thickener (Optiflo® H 370, Sud-Chemie AG, Munich, Germany) were added.

COMPARATIVE EXAMPLE 3

Example 10 was repeated except that a styrene-acrylate dispersion was used as binder instead of the alkyd resin emulsion.

EXAMPLE 11

A white gypsum plasterboard panel was in each case coated with a 10 cm wide strip of the tobacco liquor prepared in Example 9 and also with the dye Eosin Scarlet. The panel was air dried for 2 days and then coated at an angle of 90° to the color strips with strips of the paint obtained in Example 10 and also Comparative Example 3, each strip being overcoated with one, two and three layers. The assessment criterion was whether the dye was still visible after drying. Assessment was done on a scale from 1 to 5, where 1 indicates no effect and 5 indicates complete obscuring. The results are summarized in Table 1.

TABLE 1

Obscuring effect of paints

| Layers | Example 2 | Example 3 | Comp. 1 | Comp. 2 | Comp. 3 |
|---|---|---|---|---|---|
| 1 | 4 | 4 | 2 | 2 | 1 |
| 2 | 5 | 5 | 3-4 | 3-4 | 2 |
| 3 | 5 | 5 | 5 | 5 | 3 |

The paints obtained in Examples 2 and 3, which each comprise an alkyd resin having amino groups attached to the resin by a covalent bond, give a high blocking effect with a single coat. Repeated coating provides a reliable blocking effect so that dyes from the tobacco liquor are no longer able to migrate to the surface of the paint layer.

In the case of Comparative Examples 1 and 2, utilizing paints containing an alkyd resin merely having (non-basic) urethane groups introduced into the alkyd resin in the course of the precrosslinking by a diisocyanate, a single coat does not provide a satisfactory blocking effect. The blocking effect can be increased by applying the paint repeatedly. However, it is necessary for the paint to be applied at least three times to achieve a satisfactory blocking effect.

In the case of Comparative Example 3, utilizing a paint containing a styrene-acrylate dispersion as binder, a satisfactory blocking effect was not achieved even in the case of multiple paint application.

EXAMPLE 12

A white gypsum plasterboard panel was coated with strips of tobacco liquor and Eosin Scarlet as described in Example 11. The emulsions obtained in Examples 2 to 8 and also Comparative Examples 1 to 3 were diluted with water to a resin content of 25±1% by weight and the plasterboard was in each case overcoated with a strip at an angle of 90° to the dye strips. After drying (24 hours at room temperature), these strips were then overcoated with the styrene-acrylate emulsion paint from Comparative Example 3. The blocking effect was assessed via the degree to which the dye was visible on the surface after coating. Assessment was again done on a scale from 1 to 5. The results are reproduced in Tables 2 and 3.

TABLE 2

Blocking effect of inventive emulsion paints

| | Example | | | | | | |
|---|---|---|---|---|---|---|---|
| | 2 | 3 | 4 | 5 | 6 | 7 | 8 |
| Assessment | 5 | 5 | 4 | 4 | 4 | 4 | 5 |

TABLE 3

Blocking effect of noninventive paints

| | Comparative Example | | |
|---|---|---|---|
| | 1 | 2 | 3 |
| Assessment | 2 | 2 | 1 |

The inventive examples all gave a good to very good blocking effect, while the comparative examples were only able to produce a low or nonexistent blocking effect.

The invention claimed is:

1. An aqueous alkyd resin emulsion containing a resin obtained by reaction of a composition comprising:
    10 to 35 wt. % of at least one polyhydric alcohol having at least two hydroxyl groups which has a molecular weight of at least 60 g/mol,
    3 to 15 wt. % of at least one polyetherpolyol having a molecular weight of 400 to 8000 g/mol,
    10 to 60 wt. % of at least one monobasic carboxylic acid, and
    10 to 40 wt. % of at least one polybasic carboxylic acid having at least two carboxyl groups or its anhydride,
    wherein the resin obtained by the reaction further comprises at least one nitrogen-containing basic group which is provided by a molecule which has at least one nitrogen-containing basic group or a molecule which has at least one protected nitrogen-containing basic group, and which has a molecular weight of at least 100 g/mol, wherein the nitrogen-containing basic group is attached to the resin by a covalent bond.

2. The aqueous alkyd resin emulsion according to claim 1 wherein the molecule which provides the nitrogen-containing basic group(s) has a molecular weight of at least 200 g/mol.

3. The aqueous alkyd resin emulsion according to claim 1 wherein the composition further comprises an oil or fatty acid component.

4. The aqueous alkyd resin emulsion according to claim 1 wherein the emulsion has a pH of less than 7.5.

5. The aqueous alkyd resin emulsion according to claim 1 wherein the basic group(s) are selected from primary, secondary, tertiary amino group(s) and mixtures thereof.

6. The aqueous alkyd resin emulsion according to claim 1 wherein the resin has an acid number in the range of 5-30 mg KOH/g resin.

7. The aqueous alkyd resin emulsion according to claim 1 wherein the resin has nitrogen-containing basic group(s) and the resin emulsion has a nitrogen content of 0.4% to 27% by weight based on the solids content.

8. The aqueous alkyd resin emulsion according to claim 1 wherein the resin emulsion has a solids content of 25% to 75% by weight.

9. A process for preparing an alkyd resin which comprises preparing a composition comprising at least the following components:
- 10 to 35 wt. % of at least one polyhydric alcohol having at least two hydroxyl groups which has a molecular weight of at least 60 g/mol,
- 3 to 15 wt. % of at least one polyetherpolyol having a molecular weight of 400 to 8000 g/mol,
- 10 to 60 wt. % of at least monobasic carboxylic acid, and
- 10 to 40 wt. % of at least one polybasic carboxylic acid having at least two carboxyl groups or its anhydride,
- wherein the weight percentages are based on the resin; converting the composition to a resin, and modifying the resin by introduction of nitrogen-containing basic group(s), wherein the resin is modified by adding to the composition a molecule comprising at least one nitrogen-containing basic group or at least one protected nitrogen-containing group, and also at least one reactive group capable of reacting with a group of a component of the composition to form a covalent bond, wherein the molecule has a molecular weight of at least 100 g/mol, and, if the nitrogen-containing group is protected, deprotecting the nitrogen-containing group; wherein the alkyd resin comprises at least one nitrogen-containing basic group.

10. The process according to claim 9 wherein the molecule is selected from the group consisting of amino acids, diamines, oligomers of diamines having 1 to 5 repeat units, sulfonamides, sulfanilamide, high molecular weight polyamines and mixtures thereof.

11. A process for preparing an alkyd resin which comprises reacting a composition comprising at least the following components:
- 10 to 35 wt. % of at least one polyhydric alcohol having at least two hydroxyl groups which has a molecular weight of at least 60 g/mol,
- 3 to 15 wt. % of at least one polyetherpolyol having a molecular weight of 400 to 8000 g/mol,
- 10 to 60 wt. % of at least monobasic carboxylic acid, and
- 10 to 40 wt. % of at least one polybasic carboxylic acid having at least two carboxylic groups or its anhydride,
- wherein the weight percentages are based on the resin; with a molecule comprising at least one nitrogen-containing basic group, or at least one protected nitrogen-containing basic group, and at least one reactive group capable of reacting with a group of a component of the composition to form a covalent bond, wherein the molecule has a molecular weight of at least 100 g/mol, and if the nitrogen-containing group is protected, deprotecting the nitrogen containing group; wherein the reaction provides an alkyd resin which comprises at least one nitrogen-containing basic group.

12. The process according to claim 9 wherein the molecule is a diisocyanate and wherein the reaction of the resin with the diisocyanate is carried out at a pH of less than 4.

13. The process according to claim 9 wherein the resin is precrosslinked with a diisocyanate at a pH of 7.0 to 7.5.

14. A coating film obtained by preparing a resin by the process of claim 9 and evaporating the aqueous solvent.

15. A coating film obtained by preparing a resin by the process of claim 11 and evaporating the aqueous solvent.

16. A resin obtained by the process according to claim 11.

17. An aqueous alkyd resin emulsion containing a resin obtained by reaction of a composition comprising:
- 10 to 35 wt % of at least one polyhydric alcohol having at least two hydroxyl groups which has a molecular weight of at least 60 g/mol,
- 3 to 15 wt. % of at least one polyetherpolyol having a molecular weight of 400 to 8000 g/mol,
- 10 to 60 wt. % of at least monobasic carboxylic acid, and
- 10 to 40 wt. % of at least one polybasic carboxylic acid having at least two carboxylic groups or its anhydride,
- wherein the emulsion further contains a molecule separate from the resin which molecule has at least two nitrogen-containing basic groups and which has a molecular weight of at least 100 g/mol.

18. The aqueous alkyd resin emulsion according to claim 17 wherein the molecule which contains the at least two nitrogen-containing basic groups has a molecular weight of at least 200 g/mol.

19. The aqueous alkyd resin emulsion according to claim 17 wherein the composition further comprises an oil or fatty acid component.

20. The aqueous alkyd resin emulsion according to claim 17 wherein the emulsion has a pH of less than 7.5.

21. The aqueous alkyd resin emulsion according to claim 17 wherein the basic groups are selected from primary, secondary, tertiary amino groups and mixtures thereof.

22. The aqueous alkyd resin emulsion according to claim 17 wherein the resin has an acid number in the range of 5-30 mg KOH/g resin.

23. A resin obtained by reaction of a composition comprising
- 10 to 35 wt. % of at least one polyhydric alcohol having at least two hydroxyl groups which has a molecular weight of at least 60 g/mol,
- 3 to 15 wt. % of at least one polyetherpolyol having a molecular weight of 400 to 8000 g/mol,
- 10 to 60 wt. % of at least monobasic carboxylic acid, and
- 10 to 40 wt. % of at least one polybasic carboxylic acid having at least two carboxylic groups or its anhydride,
- wherein the weight percentages are based on the composition;
- wherein the resin obtained by the reaction further comprises at least one nitrogen-containing basic group which is provided by a molecule which has at least one nitrogen-containing basic group or a molecule which has at least one protected nitrogen-containing basic group, and which has a molecular weight of at least 100 g/mol, wherein the nitrogen-containing basic group is attached to the resin by a covalent bond.

* * * * *